(12) United States Patent
Binder et al.

(10) Patent No.: US 7,591,403 B2
(45) Date of Patent: Sep. 22, 2009

(54) TOLERANCE COMPENSATION ELEMENT

(75) Inventors: Hans Binder, Böhmenkirch (DE); Ottmar Binder, Böhmenkirch (DE); Wolfgang Schabel, Ottenbach (DE)

(73) Assignee: Suddeutsche Aluminium Manufaktur GmbH, Bohmenkirch (DE)

( * ) Notice: Subject to any disclaimer, the term of this patent is extended or adjusted under 35 U.S.C. 154(b) by 647 days.

(21) Appl. No.: 10/991,292

(22) Filed: Nov. 17, 2004

(65) Prior Publication Data

US 2005/0102938 A1    May 19, 2005

(30) Foreign Application Priority Data

Nov. 19, 2003    (DE) ............... 103 54 117

(51) Int. Cl.
*B60R 9/04*    (2006.01)
(52) U.S. Cl. ............... 224/325; 52/684; 224/326; 224/309
(58) Field of Classification Search ........... 52/677, 52/678, 684; 224/325, 326, 309, 917, 316, 224/324

See application file for complete search history.

(56) References Cited

U.S. PATENT DOCUMENTS

| | | | | |
|---|---|---|---|---|
| 1,051,144 A | * | 1/1913 | Manny | 254/98 |
| 4,191,227 A | * | 3/1980 | Venter | 81/44 |
| 4,299,346 A | * | 11/1981 | Helm | 224/325 |
| 4,448,336 A | * | 5/1984 | Bott | 224/309 |
| 4,780,571 A | * | 10/1988 | Huang | 174/484 |
| 5,699,944 A | * | 12/1997 | Duran | 224/326 |
| 6,178,716 B1 | * | 1/2001 | Chen | 52/678 |
| 6,363,685 B1 | * | 4/2002 | Kugler | 52/745.05 |
| 6,446,850 B2 | * | 9/2002 | Ming-Shun | 224/324 |
| 7,086,203 B2 | * | 8/2006 | Owen | 52/126.6 |
| 2004/0035064 A1 | * | 2/2004 | Kugler et al. | 52/126.6 |

FOREIGN PATENT DOCUMENTS

| | | |
|---|---|---|
| DE | 31 21 086 A1 | 12/1982 |
| DE | 31 33 932 A1 | 3/1983 |
| DE | 35 24 558 A1 | 1/1987 |
| DE | 36 20 005 C1 | 9/1987 |
| DE | 37 36 028 C1 | 2/1989 |
| DE | 39 32 193 A1 | 4/1991 |
| DE | 92 09 769.3 | 11/1992 |
| DE | 42 20 842 A1 | 1/1994 |

(Continued)

OTHER PUBLICATIONS

European Search Report dated Feb. 14, 2005.

*Primary Examiner*—Richard E Chilcot, Jr.
*Assistant Examiner*—Chi Q Nguyen
(74) *Attorney, Agent, or Firm*—Harness, Dickey & Pierce, PLC

(57) ABSTRACT

The invention refers to a spacing device for bridging a gap between a carrier part and a roof body and intended for fastening a roof rack, roof rail, roof strip or the like on a vehicle roof, with a support part and a counter-support part, the support part and the counter-support part being held together by a screw connection and being displaceable relative to one another to allow the adjustment of the bridging length, the support part and/or counter-support part being provided with an internally disposed adjustment tool-gripping seat intended for the manipulation and/or adjustment of the bridging length.

24 Claims, 7 Drawing Sheets

FOREIGN PATENT DOCUMENTS

| | | |
|---|---|---|
| DE | 42 40 079 A1 | 6/1994 |
| DE | 195 42 489 A1 | 5/1997 |
| DE | 195 46 703 C1 | 9/1997 |
| DE | 197 06 611 C1 | 4/1998 |
| DE | 102 39 022 A1 | 3/2004 |
| WO | WO 03/062016 A1 | 7/2003 |

* cited by examiner

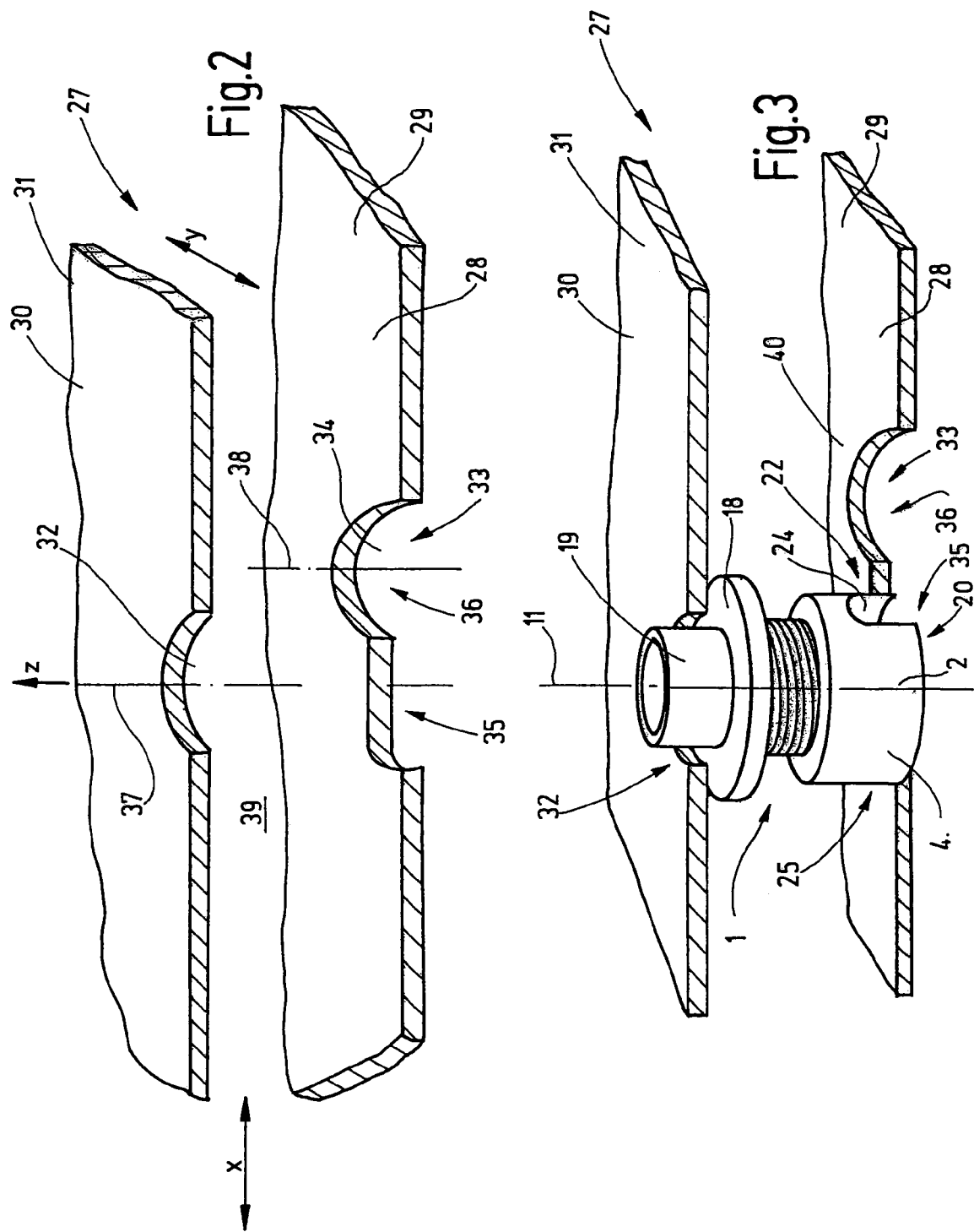

TOLERANCE COMPENSATION ELEMENT

FIELD OF THE INVENTION

The invention refers to a spacing device for bridging a gap between a carrier part and a roof body for the purpose of fastening a roof rack, roof rail, roof strip or the like to a vehicle roof.

BACKGROUND OF THE INVENTION

Roof racks, roof rails, roof strips or the like when installed on the vehicle roof of a vehicle do not rest on a roof body consisting of thin sheet metal, but by means of a spacing device are connected to a carrier part. The carrier part can absorb the forces generated by heavy roof loads and, in particular, forces that are to be expected in accident situations (major deceleration). The carrier part cannot be seen from the outside, because it is disposed below the sheet metal of the roof body. The carrier part cannot be seen from the interior space of the vehicle, either, because it is covered by the interior trim (headliner). Between the underside of the roof body and the top side of the carrier part there is present a gap which because of fabrication tolerances varies in height. During the installation of the roof rack, a solid connection with the carrier part must be ensured, but at the same time no pressure must be exerted on the roof body, pressure that would cause sheet metal deformation and lead to bothersome rejections.

The installation of known spacing devices is costly. It is possible, for example, to use spacing devices of different lengths, in which case the installer must select a spacing device adapted to the height of the gap in question and then do the installation.

SUMMARY OF THE INVENTION

The object of the invention is to provide a simple spacing device that is readily installed and widely usable, the installation preferably being possible without any problems also by untrained personnel.

To reach this objective, taking into consideration the aforesaid characteristics, the spacing device is provided with a supporting part and a counter-supporting part, said supporting and counter-supporting parts being held together by a screw connection and being displaceable relative to one another for the purpose of adjusting the bridging length, the supporting part and/or the counter-supporting part having an internally disposed gripping seat for the engagement of the adjustment tool. By "internally disposed gripping seat for the adjustment tool" is meant a seat for the adjustment tool that is not located at the periphery of the spacing device or that extends beyond said periphery, but is disposed so that the adjustment tool grips the internal parts of the spacing device without itself extending beyond the said periphery or—in the area of a partial periphery—extends beyond it only insignificantly. In this manner, it is possible to install the spacing device between the carrier part and the roof body from inside the motor vehicle, namely from the passenger compartment. Once this is done, it is possible, also from inside the vehicle, to perform the screw-tightening needed to secure the roof rack or the like. In this case, the spacing device on the one side rests on the carrier part and on the other side is screwed into a thread in the roof rack. The spacing device bridges the gap between the carrier part and the roof body and is capable of transferring to the carrier part the forces generated in the roof rack as a result of installation or use without thereby deforming or unduly stressing the roof body.

Advantageous embodiments of the spacing device are covered in the subclaims.

The invention also relates to a vehicle roof region with a carrier part, a roof body disposed at a distance therefrom and thus forming a gap between it and said carrier part and a spacing device serving to bridge said gap for the purpose of fastening a roof rack, roof rail, roof strip or the like on the vehicle roof, the carrier part being provided with an opening that tapers off sideways and the maximum width of which permits the passage of the spacing device, the reduced width preventing said passage. In this manner, the spacing device can be pushed into the gap from inside the vehicle through the appropriate wide region of the opening. Once this is done, the spacing device is displaced laterally in the gap, namely it is moved crosswise relative to the aforementioned insertion movement in a manner such that the spacing device reaches the tapered-off region of the width of the opening so that it can rest on the marginal regions of the opening, the reduced width of the opening preventing the spacing device from receding into the vehicle interior. For the said axial insertion of the spacing device and the subsequent radial displacement one uses an adjustment tool that fits the aforesaid adjustment tool-gripping seat of the support part and/or the counter-support part. On the adjustment tool, the spacing device is held axially. With the adjustment tool, it is possible to handle/manipulate the spacing device, namely with said adjustment tool the spacing device can be inserted from inside the vehicle into the gap axially and then displaced there radially. The terms "axial" and "radial" refer to the axis of rotation of the thread connection between the support part and the counter-support part. It is also possible, simply by actuating the section of the adjustment tool extending into the interior of the vehicle, to rotate the support part and the counter-support part relative to one another and thus to adjust the bridging distance in a manner such that the support part rests on the carrier part and the counter-support part is supported by the roof body. For the afore-described installation work, the adjustment tool grips the spacing device in self-locking manner and is provided with torsion-transfer means to permit the rotation of the support part relative to the counter-support part.

Advantageous embodiments of the motor vehicle roof region are covered by the subclaims.

The invention also relates to a method for positioning and/or actuating a spacing device disposed in a gap between the carrier part and a roof body for the purpose of subsequently fastening on the vehicle roof a roof rack, roof rail, roof strip or the like, the insertion being performed from inside the vehicle through an opening in the carrier part.

Advantageous embodiments of the method are covered by the subclaims.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 shows a cutaway view in perspective of a vehicle roof region;

FIG. 3 shows the view of FIG. 2, but with the spacing device inserted;

DETAILED DESCRIPTION OF THE PREFERRED EMBODIMENTS

The following description of the preferred embodiments is merely exemplary in nature and is in no way intended to limit the invention, its application, or uses.

Figure 1:
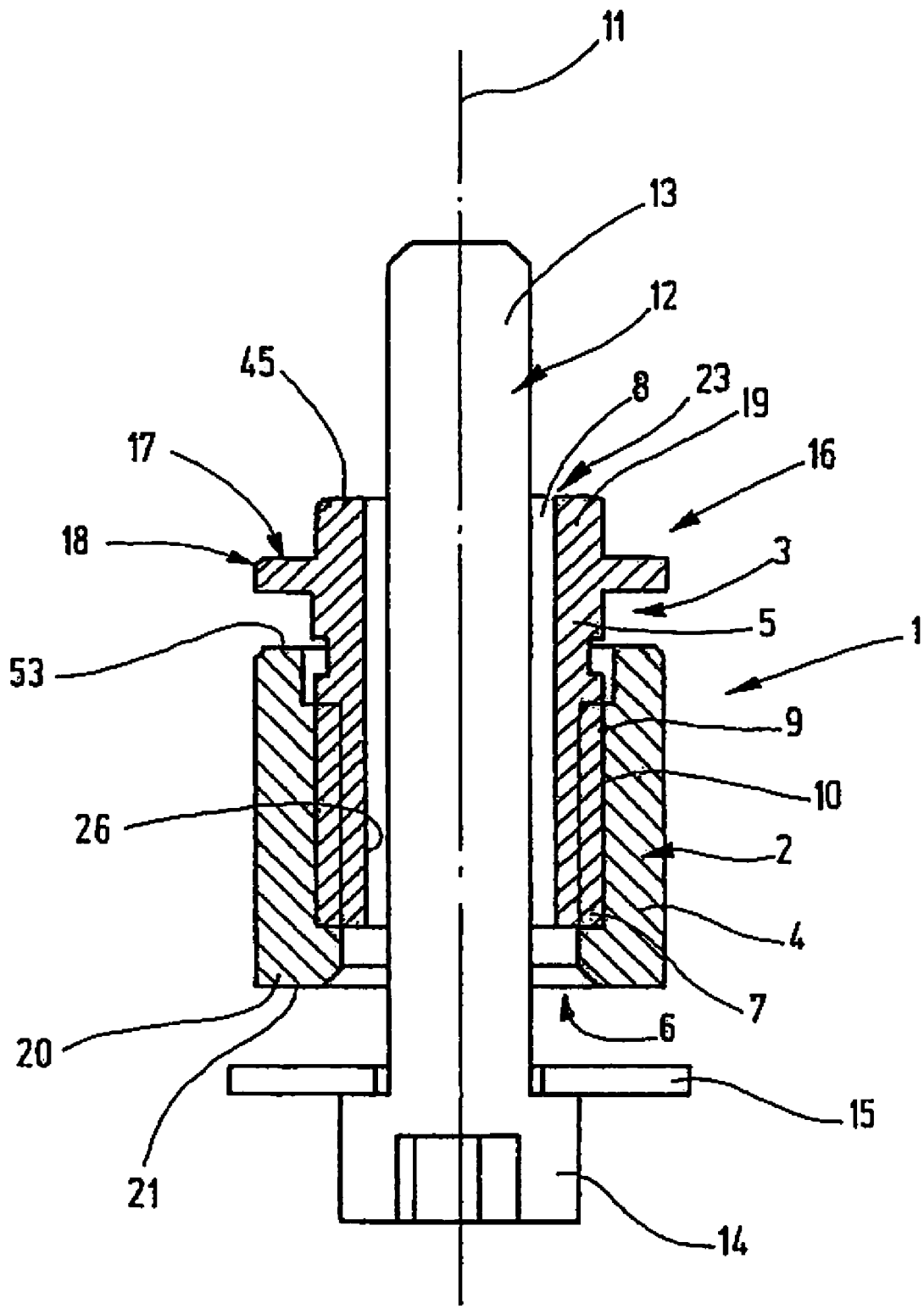
FIG. 1 shows a longitudinal cross-section of the spacing device with a thread for fastening the roof rack, roof rail or roof strip.

FIG. 1 shows a spacing device 1 intended for the installation of a roof strip on a vehicle root Spacing device I is provided with a support part 2 and a counter-support part 3. Support part 2 is designed as an outer sleeve 4 and counter-support part 3 as an inner sleeve 5. Outer sleeve 4 has an axial through-bore 6 with inner thread 7. Inner sleeve 5 is provided with an axial through-channel 8. On its outer casing surface 9, inner sleeve 5 is provided with an outer thread 10. Inner thread 7 and outer thread 10 are screwed into each other, meaning that inner thread 7 is axially screwed into outer sleeve 4. In FIG. 1, the axial direction is indicated by midline 11.

As can be seen from FIG. 1, shaft 13 of screw 12 passes through channel 8 and the corresponding part of through-bore 6. Head 14 of screw 12 is provided with a washer 15 of relatively large diameter.

As can be seen from FIG. 1, counter-support part 3 protrudes somewhat beyond support part 2. This is also the case when both parts are screwed together as much as possible and as a result counter-support part 3 has in the region of the protruding end 16 a roof body contact surface 17 in the form of a collar 18 which extends radially beyond outer thread 10 and has a diameter approximately equal to that of outer sleeve 4. Hollow connecting piece 19 extends axially beyond collar 18, said connecting piece forming a single piece on counter-support part 4 and also being passed through by pass-through channel 8. On the side facing screw head 14 namely facing away from collar 18, outer sleeve 4 is provided with an end face 20 forming a carrier part contact surface 21.

On both the support part 2 and counter-support part 3, there is provided an adjustment tool-gripping seat 22, 23, adjustment tool-gripping seat 22 being located on support part 2 and adjustment tool-gripping seat 23 on counter-support part 3. From FIG. 3 it can be seen that adjustment tool-gripping seat 22 is in the form of an open-edge sleeve wall recess 24 oriented toward end face 20 of support part 2. This sleeve wall recess 24 can pass radially through the entire wall thickness of outer sleeve 4. In particular, diametrically opposite midline 11 there is provided in the wall of outer sleeve 4 an additional sleeve wall recess not seen in FIG. 3 because of the particular rotational position of outer sleeve 4, but which is indicated by an arrow 25. Adjustment tool-gripping seat 23 is located on inner sleeve 5 in the form of pass-through channel 8 or a wall section 26 of pass-through channel 8. In other words, it is possible, by means of an adjustment tool to be described in greater detail in the following, to approach end face 20 of spacing device 1 along midline 11, the adjustment tool having a supporting pin that enters into the through-channel. Moreover, the adjustment tool has a stop that can be rotated relative to the supporting pin, which stop is pushed axially from the side of end face 20 into at least one of the sleeve wall recesses 24. This is done so that the adjustment tool—at least in the region facing spacing device 1—does not extend radially beyond the periphery of spacing device 1 around midline 11 thus enabling the installation of spacing device 1. This will be discussed in greater detail in the following. It is possible for the supporting pin of the adjustment tool to engage pass-through channel 8 frictionally. This can be accomplished, for example, if from the supporting pin a spring-loaded pressure part extends laterally which—when pushed into pass-through channel 8—is spring-deflected to a corresponding extent thus transferring a frictional force when the adjustment tool is turned around midline 11. In the afore-mentioned case, through-channel 8 can be shaped as a cylinder bore. Alternatively, it is also possible for the supporting pin—seen in cross-section—not to have rotational symmetry, but, for example, to have the shape of a polygon, with the cross-section of the through-channel 8 having the same shape, so that rotational entrainment can take place.

FIG. 2 shows a vehicle roof region 27 of a vehicle not represented in greater detail. Vehicle roof region 27 has a carrier part 28 in the form of a stable metal sheet 29 and—at a distance therefrom in the Z-direction—a roof body 30, namely the painted roof sheet 31 that can be seen from the outside. The distance in the Z-direction between these two metal sheets can fluctuate in the course of the fabrication because of fabrication tolerances. Carrier part 28 cannot be seen from inside the vehicle, because it is covered by the roof trim (headliner). In roof body 30 is provided a circular opening 32. Located beneath this opening 32 in carrier part 28 is a tapered-off opening 33 shaped as a keyhole opening 34. The arrangement is such that the reduced width 35—as seen in Z-direction—is disposed underneath opening 32 and that the larger, maximum width 36 of opening 33 is displaced in the X-direction toward the Z-axis that extends through circular opening 32. In FIG. 2, the Z-axis is indicated by line 37, and the midpoint of the maximum width 36 of opening 33 is indicated by line 38. Because of the distance between the two structural components, a gap is formed between roof body 30 and carrier part 28 which gap—as will be explained in greater detail hereinbelow—is bridged by spacing device 1. This bridging can be seen in FIG. 3, namely in that figure spacing device 1 is disposed in gap 29 and with one end extends into opening 32 and with the other end rests on internal side 40 of carrier part 28. In the following, the introduction of spacing device 1 into gap 39 will be explained in greater detail. In FIGS. 2 and 3, metal sheets 29 and 31 are shown in cutaway manner so that only parts of opening 32 and opening 33 are recognizable. In actuality, opening 32 is a circular opening and opening 33 is a keyhole opening 34.

Figure 4:
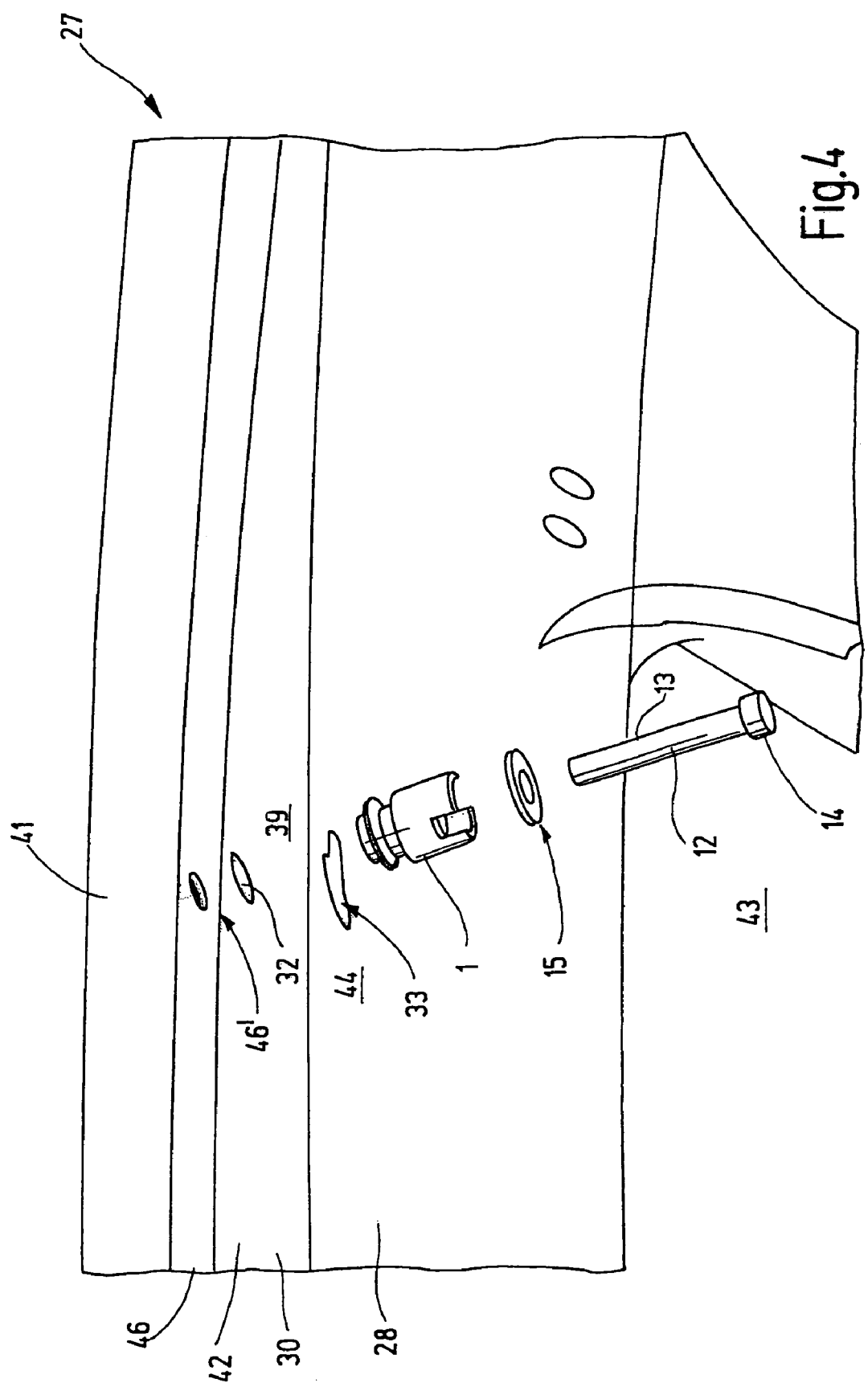
FIG. 4 is a view in perspective from the interior space of a vehicle, particularly a motor vehicle, with an exploded view of the spacing device with a washer and the screw, as well as the roof strip.

FIG. 4 shows the installation of a roof strip 41 on roof 42 of a motor vehicle not shown in greater detail. Roof 42 is formed by roof body 30 shown in FIGS. 2 and 3. Seen from the interior of the vehicle, the afore-mentioned carrier part 28 lies below roof body 30, access to said carrier part 28 being possible because the roof trim has not yet been installed. FIG. 4 shows only a partial segment of vehicle roof region 27 and thus also only a segment of roof strip 41 to be installed on the roof.

To install the spacing device 1 shown in FIG. 4, said spacing device must be introduced from interior space 43 through opening 33 into gap 39. By means of screw 12, roof strip 41 is then screwed tight, washer 15 being supported by the underside 44 of carrier part 28. As can be seen from FIG. 1, shaft 13 of screw 12 passes through pass-through bore 6 and pass-through channel 8 of spacing device 1. With hollow connecting piece 19, spacing device 1 passes through opening 32 of the roof body, the end face 45 (see FIG. 1) of inner sleeve 5 resting on underside 46 of roof strip 41 so that end surface 20 of outer sleeve 4 is supported on internal side 40 of carrier part 28. Threaded shaft 13 of screw 12 is screwed into a threaded bore 46' of roof strip 41 thus bringing about an axial tightening of the structural components, with a tight compression existing between head 14 of screw 12 and the underside 46 of roof strip 41 without an unduly high stress being exerted on roof body 30, namely the relatively sensitive, painted metallic roof sheet 31 of the motor vehicle. This is because, while end face 45 is resting against underside 46 of roof strip 41, spacing device 1 cannot be compressed in axial direction and, hence, a support for end surface 20 is provided on internal side 40 of carrier part 20, and the underside 44 is stressed by washer 15 and the latter by head 14.

Figure 5:
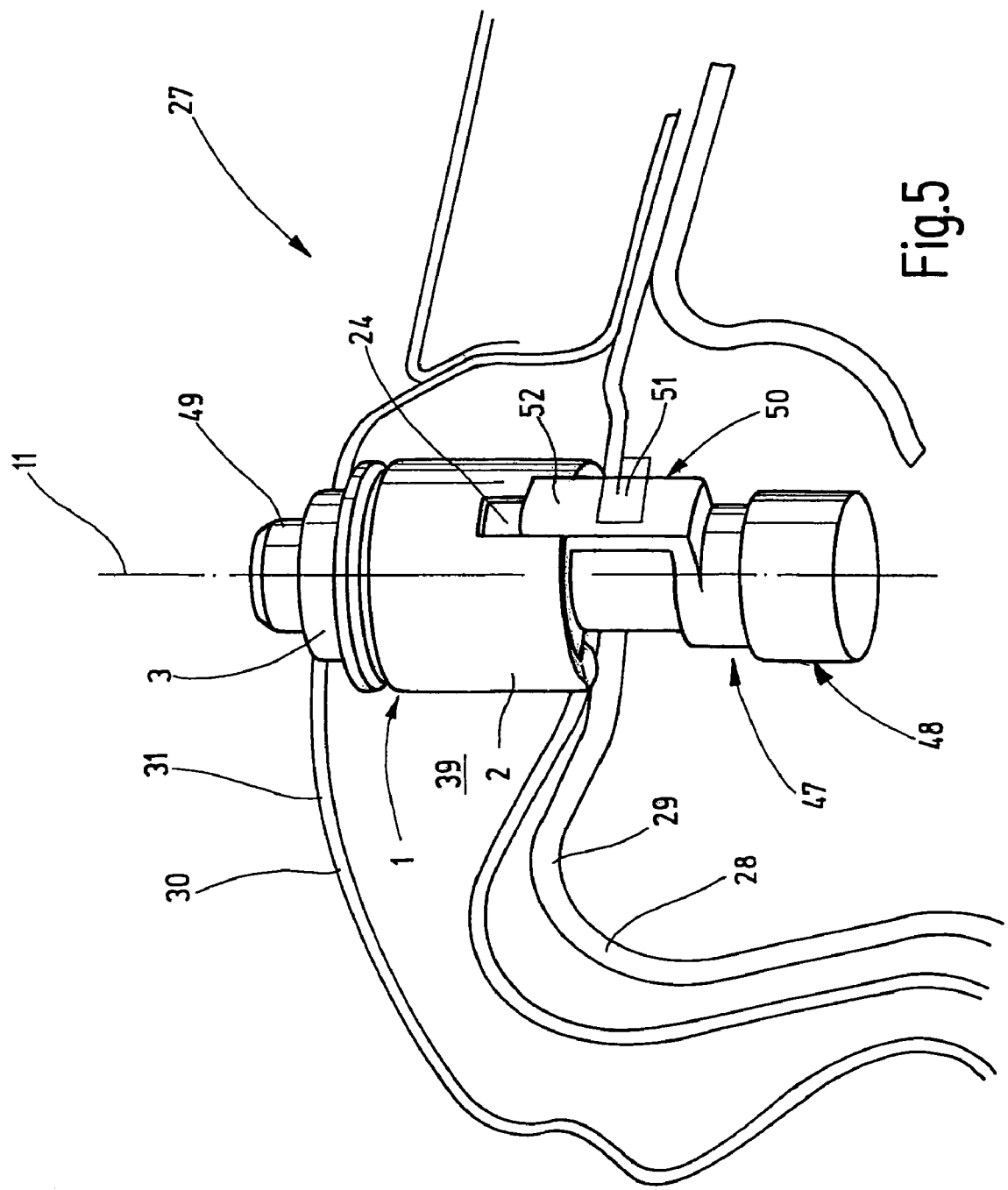
FIGS. 5 to 7 are views in perspective relating to the installation of the spacing device, by use of an adjusting tool, into the gap between the roof body of the vehicle and the carrier part of the vehicle.
Figure 8:
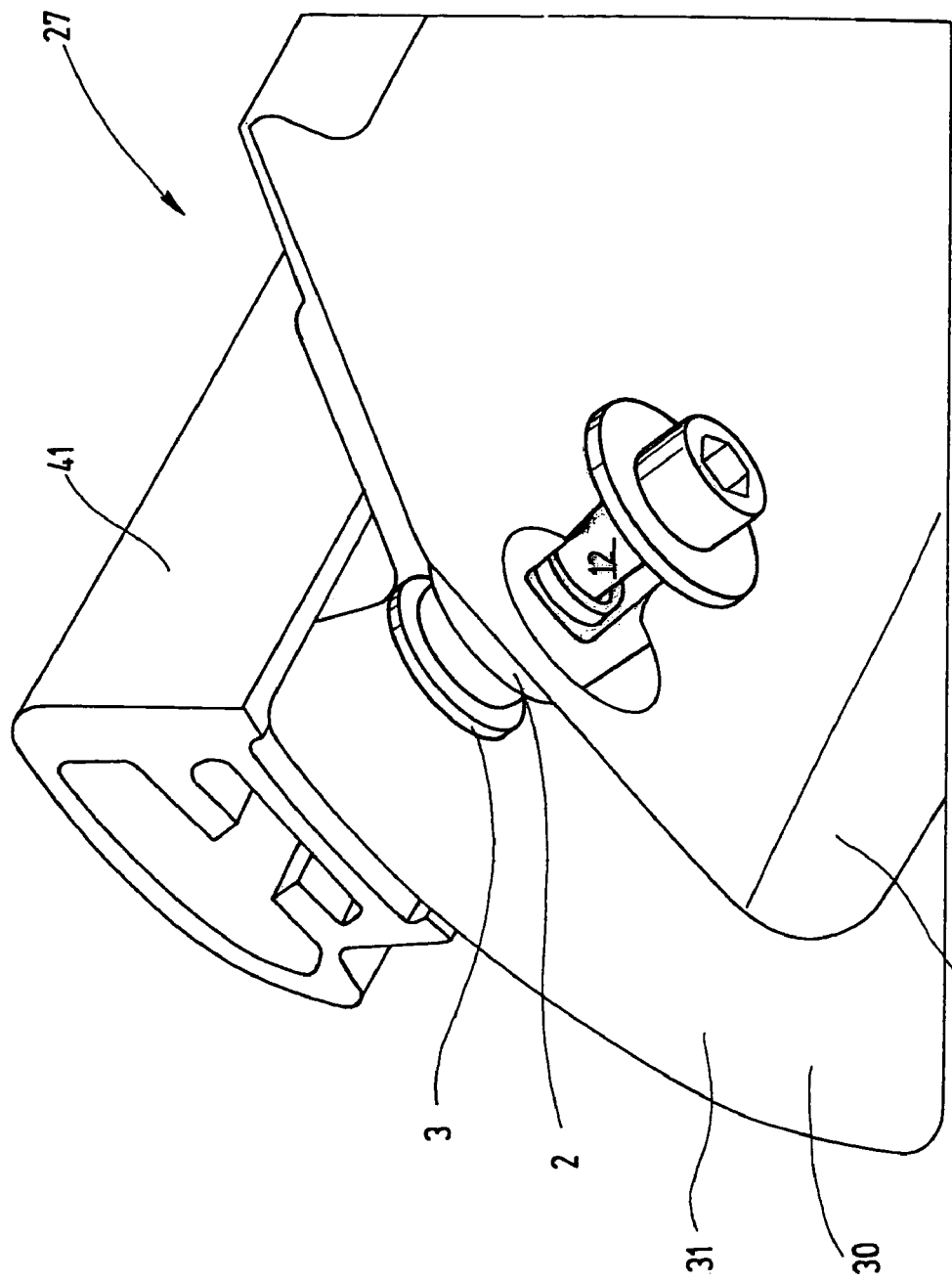
FIG. 8 is a cutaway view in perspective of the vehicle roof section provided with the spacing device and roof strip.

In the following will be discussed in detail how this installation condition can be arrived at. FIGS. 5 and 8 show sectional views of vehicle roof region 27. Also shown is an adjustment tool 47 which on one end has an actuation segment 48 and on the other end is provided with supporting pin 49 which—as can be seen from FIG. 5—can take up spacing device 1 when with its pass-through channel 8 said device is axially placed on supporting pin 49 (midline 11). In this manner, a positive lock between supporting pin 49 and pass-through channel 8 and thus counter-support part 48 is obtained in that by rotating actuation segment 48 about midline 11 a corresponding rotation of counter-support part about midline 11 takes place. Relative to supporting pin 49, there is provided on adjustment tool 47 a stop 50 which—independently of the rotation of supporting pin 49 or actuation segment 48—can be rotated about midline 11. Stop 50 has an entraining pin 51 which extends parallel to supporting pin 49 and the free end region 52 of which can be inserted axially into a sleeve wall recess 24 of support part 2. This can be seen in FIG. 5. Entraining pin 51 extends beyond the periphery of support part 2 in radial direction.

Spacing device 1 is installed in the following manner: An installer in interior space 43 of the vehicle places onto adjustment tool 47 a spacing device 1 which is completely screwed together, namely the underside of collar 18 rests on end face 53 of outer sleeve 4 or at only a slight distance therefrom. The installer then seizes the actuation region 48 of adjustment tool 47 and from the interior space 43 of the vehicle inserts spacing device 1 into keyhole opening 34 at its maximum width 36. In this situation, spacing device 1 is located in hollow space 39 and actuation region 48 lies in internal space 43, namely below underside 44 of carrier part 28. From interior space 43, the installer now, with the aid of adjustment tool 47, displaces spacing device 1 in the X-direction into the region of reduced width 35 of keyhole opening 34 in a manner such that end face 20 can support itself on the marginal regions of opening 33 that is tapered off in the direction of its width. This reduced width prevents the spacing device 1 from receding into internal space 43. Because adjustment tool 47 has an appropriate slender shape, it fits into the tapered-off width 35 of opening 33 thus permitting this radial displacement in gap 39. As seen from vehicle interior 43, the installer now turns actuation region 48 relative to stop 50. Stop 50 cannot turn because its width is somewhat smaller than the tapered-off width of opening 33. Hence1 by means of entrainment pin 51, support part 2 is kept from turning in gap 39 and counter-support part 3 is rotated relative to support part 2 with the aid of actuation region 48 and supporting pin 49 coupled with it, so that as a result of the thread connection of these two parts support part 2 and counter-support part 3 diverge axially from one another. This takes place until end face 20 comes to rest on internal side 40 of carrier part 28, and the roof body contact surface 17 of collar 18 of counter-support part 3 rests on the underside of roof body 30 exerting a pressure that does not deform roof body 30. To protect roof body 30, it is advantageous to provide hollow connecting piece 19, end face 45 and the top side of collar 18 as well as the marginal periphery of collar 18 with a coating particularly a polymeric coating.

The installer now pulls adjustment tool 47 axially out of spacing device 1 in the direction of vehicle interior 43. Spacing device 1 is thus pre-installed so that subsequently screw 12 plus washer 15 can be mounted to fasten the afore-mentioned roof strip 41.

Figure 6:
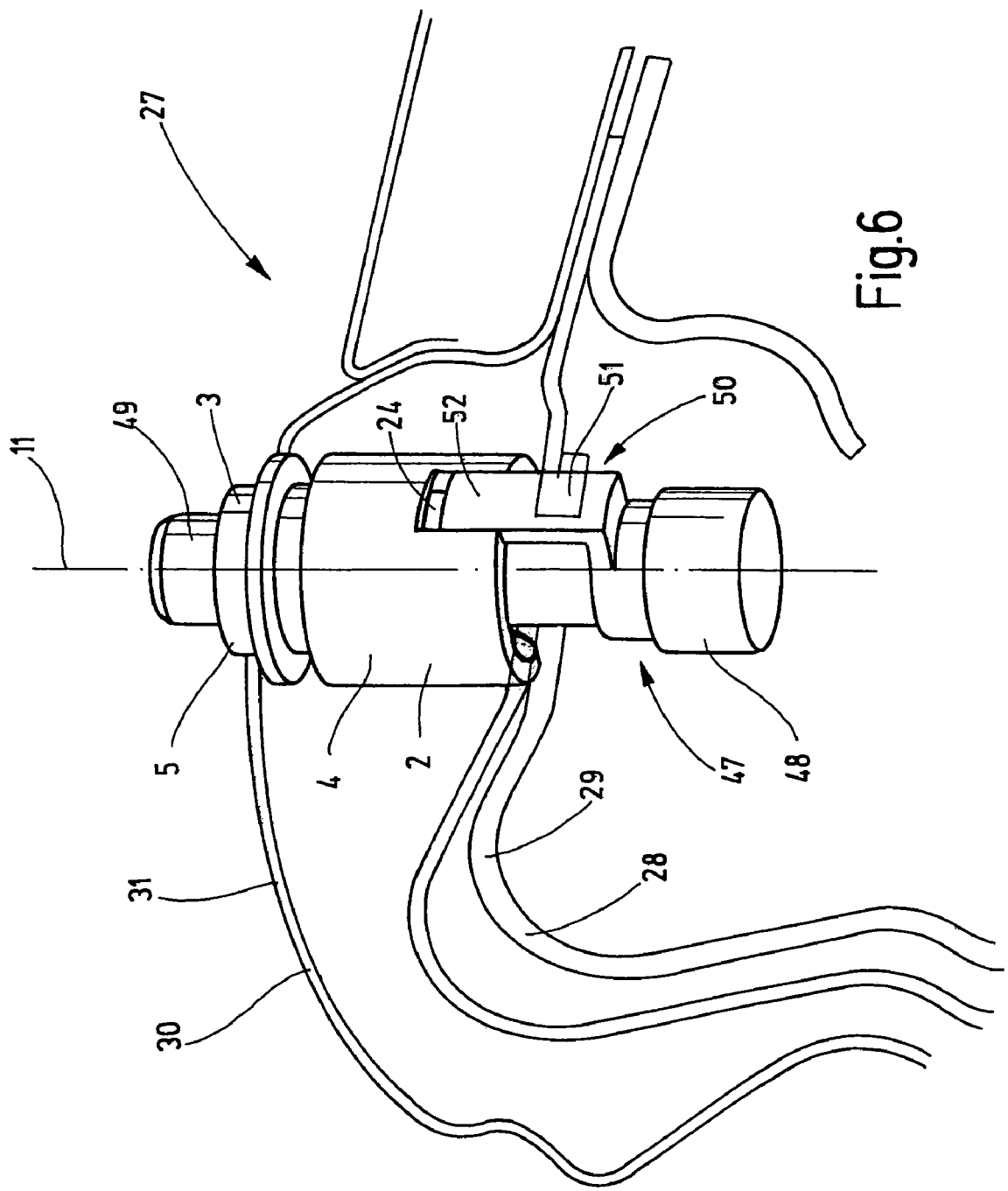
Figure 7:
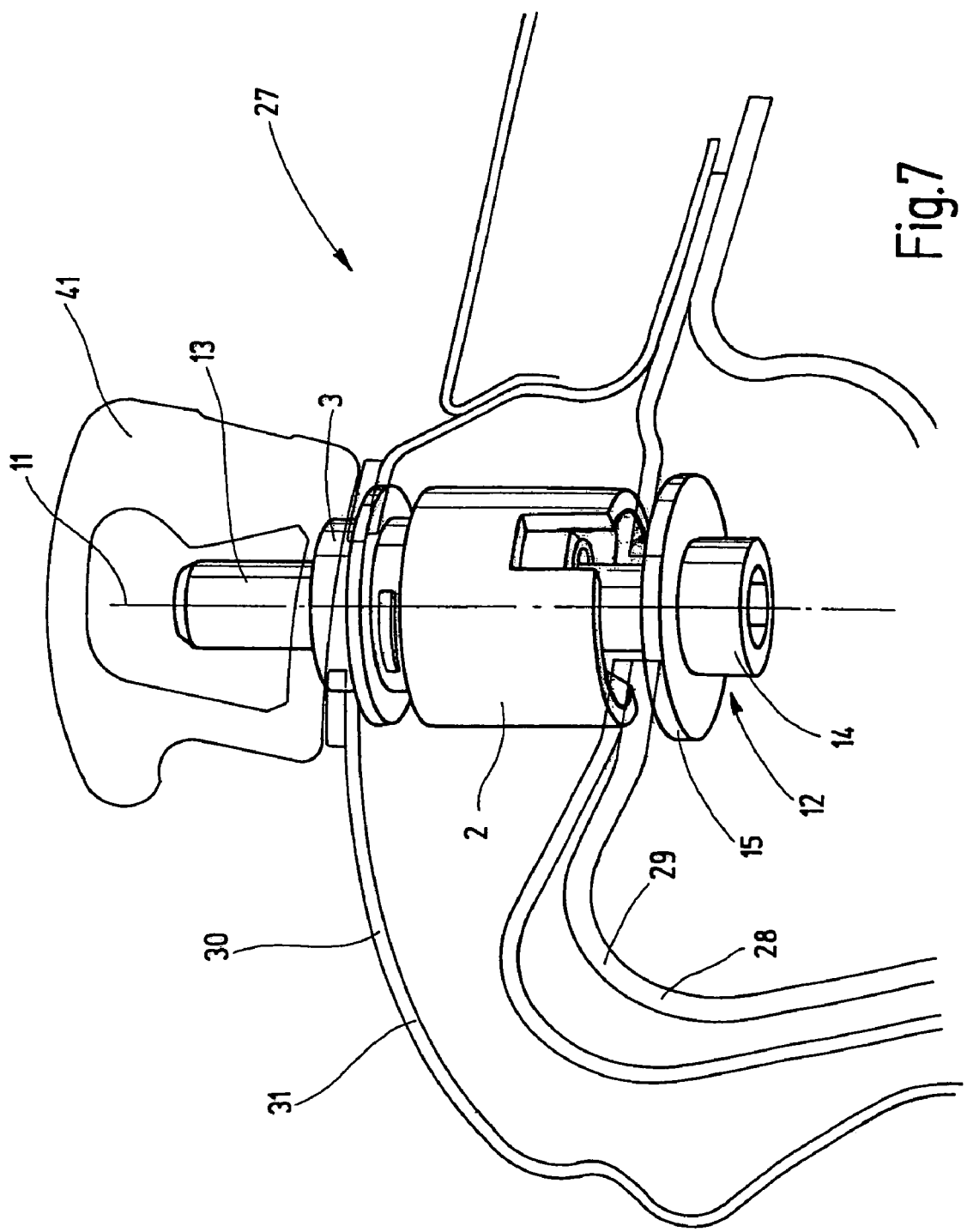

In particular, FIG. 5 shows the spacing device introduced into gap 39 with the aid of adjustment tool 47, said spacing device still being in the screwed-together condition. FIG. 6 illustrates the axial unscrewing of support part 2 and counter-support part 3 with the aid of adjustment tool 47. FIG. 7 shows the final, installed condition of roof strip 41. FIG. 8 corresponds to the representation of FIG. 7, but is rendered as a perspective drawing thus illustrating the situation.

It is understandable that spacing device 1 can be also be readily un-installed. This can be done from vehicle interior 43 by reversing the order of the individual installation steps.

In particular, it is possible to unscrew support part 2 from counter-support part 3 by placing on actuation region 48 an installation tool, for example a cordless screwdriver, provided with an appropriate friction clutch so that a defined torque is always applied and, hence, the installation of spacing device 1 is always done reproducibly. To prevent counter-rotation in the counter-clockwise sense, it is possible for the installation tool to be provided with a ratchet that will prevent said counter-rotation.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A spacing device for bridging a free space between a bearing element and a roof body for fastening a roof component to a vehicle roof, comprising:
   a support element; and
   a countersupport element;
   wherein the support element and countersupport element are held against one another via a screw connection and are displaceable relative to one another for adjusting a bridging length therebetween, and wherein the support element is an outer sleeve with an internal thread, the countersupport element is designed as an inner sleeve provided with an external thread, and the countersupport element has a through channel coaxial to the threaded connection for engaging a threaded screw for holding the roof component against the bearing element; and
   wherein the support element has at least one sleeve wall recess with an edge open at an end face of the support element, the at least one sleeve wall recess defining a first adjustment tool engaging seat, and the countersupport element has a second adjustment tool engaging seat for an adjustment tool for adjusting the bridging length.

2. The spacing device of claim 1 wherein said countersupport element includes a channel therethough and wherein said second tool engaging seat is formed by said channel.

3. The spacing device of claim 1 wherein the end face of said support element defines a carrier part contact surface.

4. The spacing device of claim 1 wherein an end of said countersupport element that extends away from said support element, defines a roof body contact surface.

5. The spacing device of claim 1 wherein said countersupport element includes a collar that defines a roof body contact surface.

6. The spacing device of claim 5 wherein said collar is over-lapped by a hollow connecting piece that is extendable into an opening of a roof body.

7. The spacing device of claim 1 wherein said adjustment tool includes a support pin that is selectively received in a pass-through channel of said spacing device.

8. The spacing device of claim 7 wherein said support pin is coupled to said pass-through channel by one of a friction and a positive locking.

9. The spacing device of claim 7 wherein said adjustment tool further includes a stop that is rotatable relative to said supporting pin and that selectively engages said gripping seat.

10. The spacing device of claim 1 in combination with a vehicle roof including the roof component, wherein:
    the bearing element is disposed a distance from said roof component to form a gap therebetween that includes a tapered opening; and
    wherein said spacing device is able to pass through a maximum width of said tapered opening and is unable to pass through a reduced width of said tapered opening.

11. The combination of claim 10 wherein said tapered opening is in a form of a keyhole.

12. A method of installing the spacing device of claim 1, comprising:
    inserting said spacing device through a maximum width of a tapered opening of said bearing element.

13. The method of claim 12, further comprising attaching the adjustment tool to said spacing device, wherein said step of inserting said spacing device is achieved using said adjustment tool.

14. The method of claim 12, wherein said spacing device is inserted into said gap axially.

15. The method of claim 12, further comprising displacing said spacing device radially within said gap to inhibit removal of said spacing device from said gap.

16. The method of claim 12, further comprising adjusting the bridging length of said spacing device within said gap to inhibit removal of said spacing device from said gap.

17. The spacing device of claim 1, wherein the countersupport element defines a roof body contact surface.

18. The spacing device of claim 17, in combination with the roof body, the roof body contact surface contacting the roof body.

19. The spacing device of claim 17, wherein the roof body contact surface is a collar circumferentially surrounding the countersupport element.

20. The spacing device of claim 1, wherein the adjustment tool engaging seat is configured to selectively engage the adjustment tool when the support element and countersupport element are operably connected.

21. The spacing device of claim 1, wherein the first adjustment tool engaging seat is in the form of an open-edge sleeve wall recess.

22. A spacing device that bridges a gap between a carrier part and a roof body and that fastens a roof component to a vehicle roof in combination with the vehicle roof including the roof component comprising:
    a first support component;
    a second support component; and
    a coupling component that couples said first support component and said second support component and that is operable to adjust a bridging length between said first support component and said second support component;
    wherein at least one of said first and second support components includes a gripping seat that enables selective attachment of an adjustment tool to adjust said bridging length;
    wherein the carrier part is disposed a distance from said roof component to form a gap therebetween that includes a tapered opening; and
    wherein said spacing device is able to pass through a maximum width of said tapered opening and is unable to pass through a reduced width of said tapered opening.

23. The spacing device of claim 22 wherein said tapered opening is in a form of a keyhole.

24. A method of installing a spacing device that bridges a gap between a carrier part and a roof body and that fastens a roof component to a vehicle root the spacing device including a first support component, a second support component, and a coupling component that couples said first support component and said second support component and that is operable to adjust a bridging length between said first support component and said second support component, one of said first and second support components including a gripping seat that enables selective attachment of an adjustment tool to adjust said bridging length, the method comprising:
    inserting said spacing device through a maximum width of a tapered opening of said carrier opening of said carrier part member.

* * * * *